United States Patent
Baum et al.

(10) Patent No.: US 7,974,332 B2
(45) Date of Patent: Jul. 5, 2011

(54) HIGH-FREQUENCY HOMEPNA

(75) Inventors: David Baum, Ramat Gan (IL); Ran Kern, Ramat Hasharon (IL)

(73) Assignee: CopperGate Communications Ltd., Tel-Aviv (IL)

(*) Notice: Subject to any disclaimer, the term of this patent is extended or adjusted under 35 U.S.C. 154(b) by 1197 days.

(21) Appl. No.: 11/626,960

(22) Filed: Jan. 25, 2007

(65) Prior Publication Data

US 2007/0153885 A1    Jul. 5, 2007

Related U.S. Application Data

(63) Continuation-in-part of application No. 11/288,437, filed on Nov. 29, 2005, now Pat. No. 7,551,693.

(51) Int. Cl.
*H04L 5/16* (2006.01)
(52) U.S. Cl. ........................................ 375/222
(58) Field of Classification Search ............... 375/222, 375/325, 326, 232, 350; 370/329, 445, 462, 370/503; 379/93.01, 413
See application file for complete search history.

(56) References Cited

U.S. PATENT DOCUMENTS

| 5,835,731 | A | 11/1998 | Werner et al. |
| 7,164,694 | B1* | 1/2007 | Nodoushani et al. ......... 370/467 |
| 7,362,998 | B2 | 4/2008 | Lai |
| 2003/0147523 | A1* | 8/2003 | Watson et al. ................ 379/344 |
| 2003/0156656 | A1* | 8/2003 | Ojard et al. .................. 375/295 |
| 2003/0161411 | A1 | 8/2003 | McCorkle et al. |
| 2004/0189378 | A1* | 9/2004 | Suzuki et al. .................. 330/52 |
| 2005/0249245 | A1* | 11/2005 | Hazani et al. ................. 370/485 |
| 2006/0114927 | A1 | 6/2006 | Baum et al. |

OTHER PUBLICATIONS

*Digital Transmission of Information*, 1990, Addison-Wesley. Section 2.3 Passband Signaling.
D.G. Manolakis, *Digital Signal Processing*, 1992, Macmillan, sections 6.1.3 Sampling of Bandpass Signals.

* cited by examiner

*Primary Examiner* — Khai Tran
(74) *Attorney, Agent, or Firm* — AlphaPatent Associates Ltd.; Daniel J. Swirsky (57) ABSTRACT

A network device includes a HomePNA modem and means for synchronizing its clock with clocks of other HomePNA modems in the network in order to communicate at a higher frequency band. In one embodiment, the synchronization is with pilot signals. In another, it is by correcting for clock differences. The upconversions may be via oversampling or via analog mixing. The downconversions may be via subsampling or via analog demixing.

30 Claims, 8 Drawing Sheets

HIGH-FREQUENCY HOMEPNA

CROSS-REFERENCE TO RELATED APPLICATIONS

This application is a continuation-in-part application claiming benefit from U.S. patent application Ser. No. 11/288,437, filed Nov. 29, 2005 now U.S. Pat. No. 7,551,693, which is hereby incorporated in its entirety by reference.

FIELD OF THE INVENTION

The present invention relates to Home PhoneLine Networking Alliance (HomePNA) networks generally.

BACKGROUND OF THE INVENTION

The Home Phoneline Networking Alliance (HomePNA) has developed a networking standard that allows HomePNA network devices to communicate over telephone lines in a home, without disturbing the existing voice, fax or ADSL (asynchronous digital subscriber line) services. There have been multiple versions of the standard, with version 3 (v3) being the most recent.

There have been attempts to adapt the HomePNA standard to also operate over coaxial lines (also known as "coax" lines), such as are commonly utilized for data services, such as cable television and cable data services. U.S. patent application Ser. No. 11/000,524, filed Dec. 1, 2004 and assigned to the common assignee of the present invention, describes generally how to extend the HomePNA v3 standard to operate over a hybrid network of telephone and coax lines.

One problem with a network on the coax lines is that, while the coax data services operate at higher frequencies than voice and ADSL services, they operate in similar ranges to that of HomePNA (which is 4-20 MHz), making it difficult to operate an HomePNA network on coax lines at the same time that other data services operate. VDSL (very high rate digital subscriber line) services may occur between 0.1 and 12 MHz but may be extended, in the VDSL 2 standard, to close to 30 MHz. Cable television may begin at 54 MHz.

SUMMARY OF THE INVENTION

It is an object of the present invention to improve on the prior art.

There is therefore provided, in accordance with a preferred embodiment of the present invention, a network device including a modem to generate HomePNA signals and a transmission unit for transmitting the HomePNA signals at upband frequencies.

Moreover, in accordance with a preferred embodiment of the present invention, the transmission unit includes an analog mixer and can also include a pilot tracking unit providing a carrier signal to the analog mixer.

Further, in accordance with a preferred embodiment of the present invention, the network device also includes a local clock providing a carrier signal to the analog mixer. It can also include an oversampler.

Still further, in accordance with a preferred embodiment of the present invention, the oversampler includes a digital interpolator to increase the sampling frequency of the HomePNA signals, a digital-to-analog converter to convert the output of the digital interpolator to an analog signal and an upband pass filter to significantly attenuate signals not within the upband frequencies.

Alternatively, in accordance with a preferred embodiment of the present invention, the network device also includes a pilot tracking unit providing a clock signal to the oversampler. Alternatively, the network device includes a local clock providing a clock signal to the oversampler.

Further, in accordance with a preferred embodiment of the present invention, the network device also includes a reception unit to downconvert signals transmitted from the transmission unit.

Moreover, in accordance with a preferred embodiment of the present invention, the reception unit includes an analog demixer and can include a pilot tracking unit providing a carrier signal to the analog demixer or a local clock providing a carrier signal to the analog demixer and a digital clock compensator using the local clock to compensate for a difference in clock frequency of the local clock and of a local clock which generated the transmitted signals.

Alternatively, in accordance with a preferred embodiment of the present invention, the reception unit includes a subsampler.

Further, in accordance with a preferred embodiment of the present invention, the subsampler includes an upband pass filter to significantly attenuate signals not within the upband frequencies and an analog-to-digital converter forming part of the reception unit and sampling at an operating clock frequency of the reception unit.

Still further, in accordance with a preferred embodiment of the present invention, the network device also includes a pilot tracking unit providing a clock signal to the subsampler.

Alternatively, the network device includes a local clock providing a clock signal to the subsampler and a digital clock compensator using the local clock to compensate for a difference in clock frequency of the local clock and of a local clock which generated the transmitted signals.

Moreover, in accordance with a preferred embodiment of the present invention, the digital clock compensator includes a phasor generator to generate a phasor from an estimated carrier offset $\hat{\eta}$ and a mixer to mix a baseband signal with the phasor.

Further, in accordance with a preferred embodiment of the present invention, the network device includes an offset estimator to determine the estimated carrier offset $\hat{\eta}$.

Still further, in accordance with a preferred embodiment of the present invention, the offset estimator includes a Hilbert transform operator to transform at least received baseband signals.

Moreover, in accordance with a preferred embodiment of the present invention, the offset estimator includes an optimizer to optimize a cost function $CF(\eta)$ of a Hilbert transform $\underline{y}$ and of at least one function of Hilbert transform $\underline{y}$. The cost function $CF(\eta)$ is:

$$CF(\eta) = |\underline{y}_{t+T} - (1 - j2\pi f_c T\eta^2)e^{j2\pi f_c T\eta}\underline{y}_t - \eta T e^{j2\pi f_c T\eta}\underline{y}'_t|^2$$

where vector $\underline{y}_{t+T}$ is the output of the Hilbert transform operator, vector $\underline{y}_t$ is a version of $\underline{y}_{t+T}$ delayed by a preamble period T, vector $\underline{y}'_t$ is a derivative of $\underline{y}_t$ and the linear combination coefficients of the vectors are functions of offset $\eta$, the preamble period T and a nominal carrier frequency $f_c$.

There is also provided, in accordance with a preferred embodiment of the present invention, a carrier offset estimator including: a Hilbert transform operator to transform at least received baseband signals and an optimizer to optimize a cost function CF(η) from the output y of the Hilbert transform operator and at least one function of y.

There is also provided, in accordance with a preferred embodiment of the present invention, a network device including a HomePNA modem and a unit for synchronizing a clock of the HomePNA modem with clocks of other HomePNA modems in a network, in order to communicate at a higher frequency band.

Further, in accordance with a preferred embodiment of the present invention, the unit for synchronizing includes a phase locked loop. Alternatively, in accordance with a preferred embodiment of the present invention, the unit for synchronizing includes a digital clock compensator.

Moreover, in accordance with a preferred embodiment of the present invention, the digital clock compensator includes a phasor generator to generate a phasor from an estimated carrier offset $\hat{\eta}$ and a mixer to mix a baseband signal with the phasor.

Further, in accordance with a preferred embodiment of the present invention, the network device includes an offset estimator to determine the estimated carrier offset $\hat{\eta}$, such as is described hereinabove.

There is also provided, in accordance with a preferred embodiment of the present invention, a network device including a unit operative during transmission for shifting a baseband frequency from a HomePNA frequency to another baseband frequency and a unit operative during reception for shifting the frequency of a received signal to an HomePNA frequency.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention may provide an upband operation for HomePNA (Home Phoneline Networking Alliance) networks.

Figure 1A:
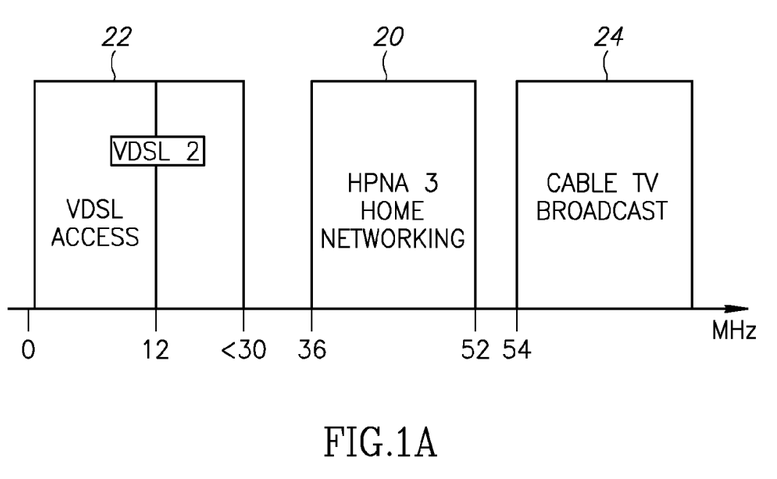
FIGS. 1A and 1B are graphical illustrations of frequency ranges for different types of services.
Figure 1B:
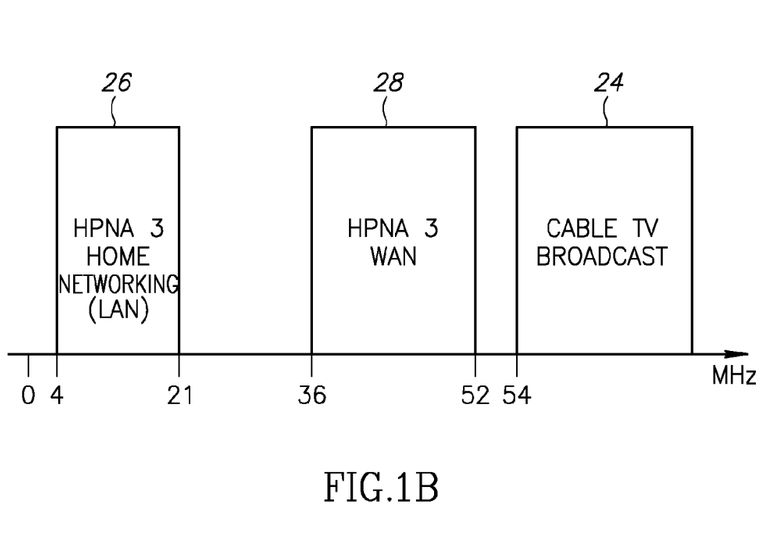

Reference is now made to FIGS. 1A and 1B, which illustrate two alternative scenarios for upband operation of HomePNA network devices. Both FIGS. 1A and 1B graph frequency bands and indicate the frequency ranges for different types of services.

The embodiment of FIG. 1A shows HomePNA network services 20 in the presence of VDSL services 22 and/or cable television services 24. VDSL services 22 may occur between 0.1 and 12 MHz but may be extended, in the VDSL 2 standard, to close to 30 MHz. Cable television 24 may begin at 54 MHz. HomePNA network services 20 may have a frequency range, such as between 36-52 MHz, which may fall above frequency range 22 for the various VDSL services and below frequency range 24 for cable television. Thus, HomePNA services 20 may operate with an ample guard band between them and the other services.

FIG. 1B illustrates a further embodiment, where two types of HomePNA network services may exist together. Two HomePNA frequency bands 26 and 28 are shown. Frequency band 26 may be in the standard HomePNA frequency range and may be operative for home networking (e.g. on a local area network (LAN)) while frequency band 28, in a higher range (36-52 MHz is shown) may be utilized for communicating externally to a wide area network (WAN), such as the Internet. The two types of HomePNA services may coexist comfortably with each other and with cable television services 24.

Higher band HomePNA may also be utilized for multiplying the communication bandwidth in multi-tenant or multi-dwelling unit (M×U) networks.

Figure 2A:
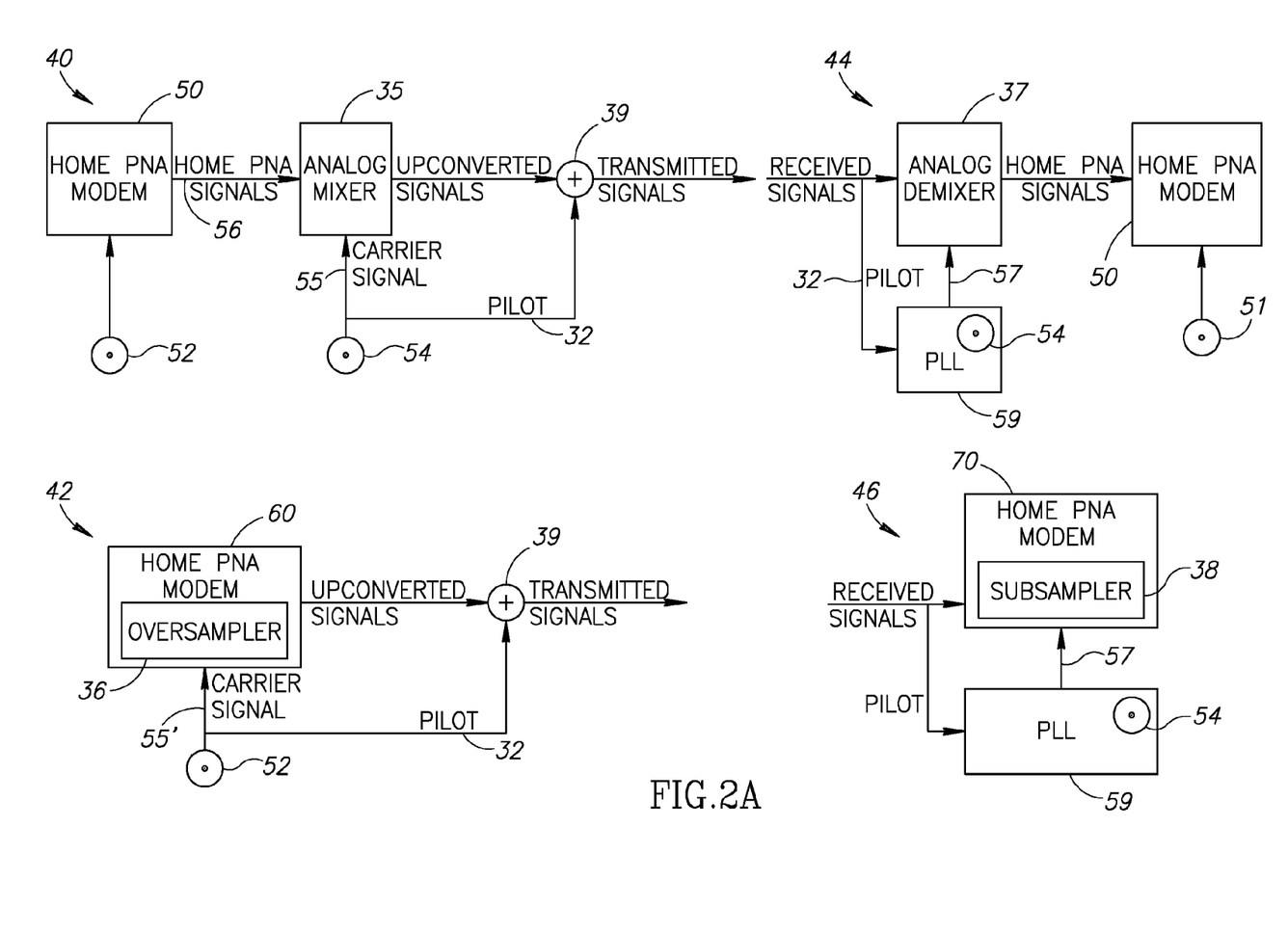
FIGS. 2A and 2B are block diagram illustrations of multiple embodiments of upband HomePNA network devices, constructed and operative in accordance with the present invention.
Figure 2B:
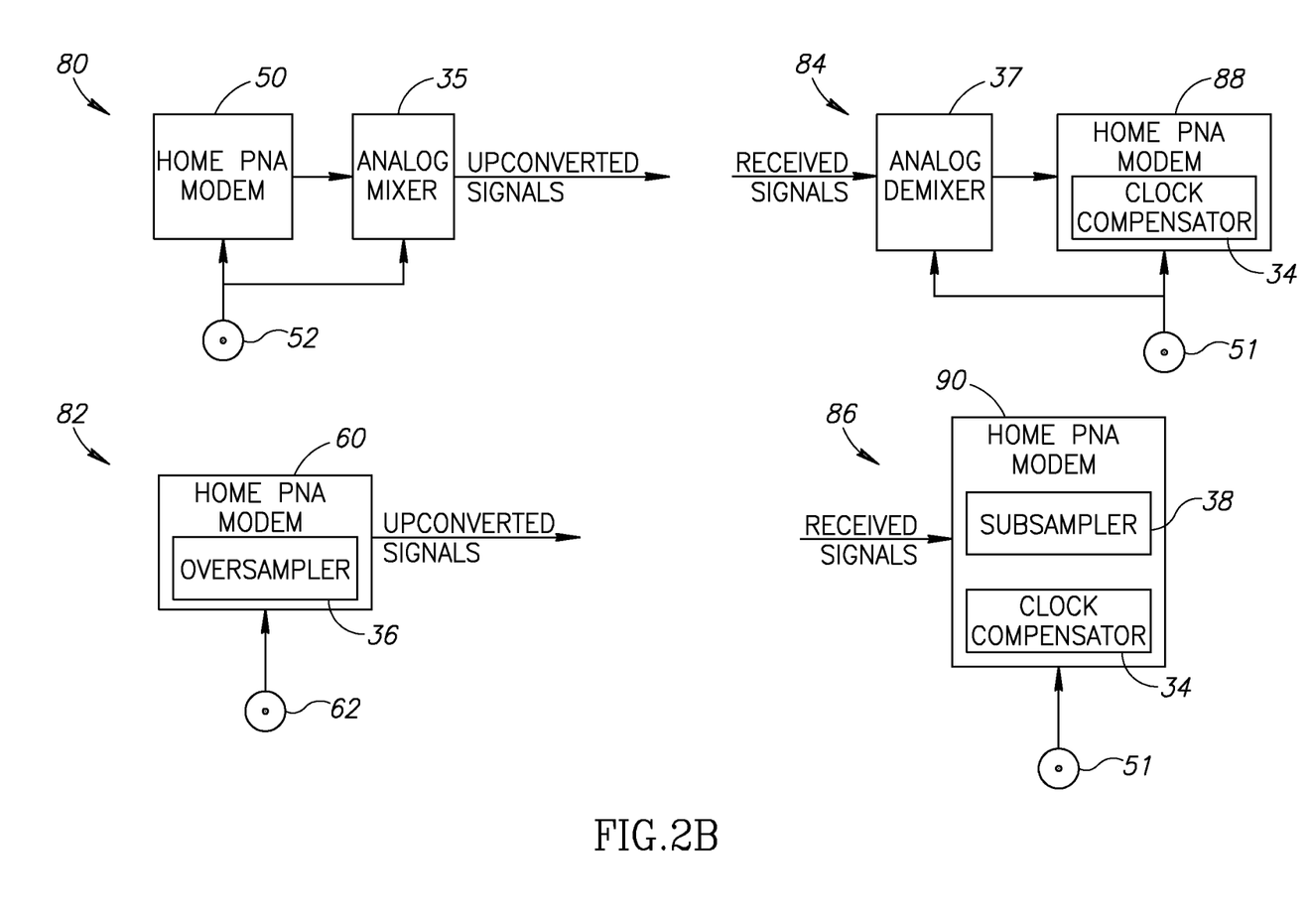

Reference is now made to FIGS. 2A and 2B which illustrate multiple embodiments of upband HomePNA network devices, constructed and operative in accordance with the present invention. The present invention includes analog and digital embodiments for generating the upband signals as well as multiple methods for processing the received signals.

Applicants have realized that simply upconverting the HomePNA signals onto a high band carrier is not sufficient. The HomePNA modems, particularly in HomePNA v3, do not have tight tolerances for the frequency of the local oscillator which provides the clock or timing signals of the modem. As a result, HomePNA local clocks are not synchronized. The HomePNA standard includes a synchronization signal in a preamble to each packet transmitted on the network and a receiving device processes the preamble to synchronize to the transmitting device and to compensate for the non-synchronized clocks. Unfortunately, modems with non-synchronized clocks are incapable of performing a precise downconversion to signals transmitted at a high carrier frequency. The inaccurate downconversion causes a residual carrier to appear, which effect prevents the demodulation of the signal by the HomePNA receiver.

The embodiments of FIGS. 2A and 2B may include one or more elements which may enable high band operation. For example, FIG. 2A illustrates operation with a pilot signal 32 transmitted on the network and to which the network devices may synchronize their clocks. In another embodiment, shown in FIG. 2B, the network devices may include digital clock compensation elements 34 which may attempt to compensate for the non-synchronized clocks.

Moreover, the upconversion may be performed with an analog mixer 35 or digitally, with an oversampler 36 forming part of the modem. The downconversion may be performed with an analog demixer 37 or digitally, with a subsampler 38 forming part of the modem.

FIG. 2A illustrates two transmitters 40 and 42 and two receivers 44 and 46 which are inter-operable. Thus, both receivers 44 and 46 may receive output from either of transmitters 40 and 42. Moreover, any of the HomePNA modems in FIGS. 2A and 2B may comprise one transmitter and one receiver in order to transmit and receive signals.

Transmitter 40 may comprise a standard HomePNA modem 50, analog mixer 35, such as is known in the art and is described in section 2.3 (Passband Signaling) of the book, *Digital Transmission of Information*, by R. E. Blahut, 1990, Addison-Wesley, and a combiner 39. HomePNA modem 50 may operate in any of versions 2-3 of the HomePNA standard and may generate HomePNA signals 56. HomePNA modem 50 may have a local clock 52, such as a local oscillator, to which HomePNA signals 56 may be timed.

Analog mixer 35 may operate together with a local clock 54, such as one operating in the vicinity of 32 MHz, which may also generate pilot signal 32. Local clock 54 may transmit pilot signal 32 to the network (not shown) and may provide a carrier signal 55 to analog mixer 35 which may use it to modulate HomePNA signals 56 onto a carrier frequency. Combiner 39 may combine pilot signal 32 with the resultant upconverted signals and may then transmit the combined signal to the network. In one embodiment, the carrier frequency may be generally 64 MHz and analog mixer 35 may include a multiplier to multiply carrier signal 55 by 2. It will be appreciated that the 32 MHz and 64 MHz frequencies are by way of example only; other frequencies of operation are included in the present invention.

It will be appreciated that there may be only one pilot signal 32 in a network, generated by one of the network devices of that network. For such a network, all of the other network devices (i.e. both transmitters and receivers) may each include PLL 59 to track pilot signal 32 and to generate tracked clock signal 57 for the units (mixers 35, demixers 37, modems 60 and/or 70) which operate with tracked carrier signal 57.

Transmitter 42 may comprise a novel HomePNA modem 60 with oversampler 36. Like in the previous embodiment, local clock 54 (in this embodiment of modem 60) may generate pilot signal 32 and a carrier signal 55'. Thus, the output of HomePNA modem 60 may be timed to pilot clock 54.

Reference is now made to FIGS. 3A, 3B, 3C and 3D, which, together, show the operation of oversampler 36. Oversampler 36 may comprise a digital interpolator 64, a choice of a low pass filter (LPF) 65 or a high pass filter (HPF) 66, a digital-to-analog (D/A) converter 68, and an upband pass filter 69 to pass the desired frequency band (e.g. the upband), such as within 36-52 MHz.

Figure 3A:
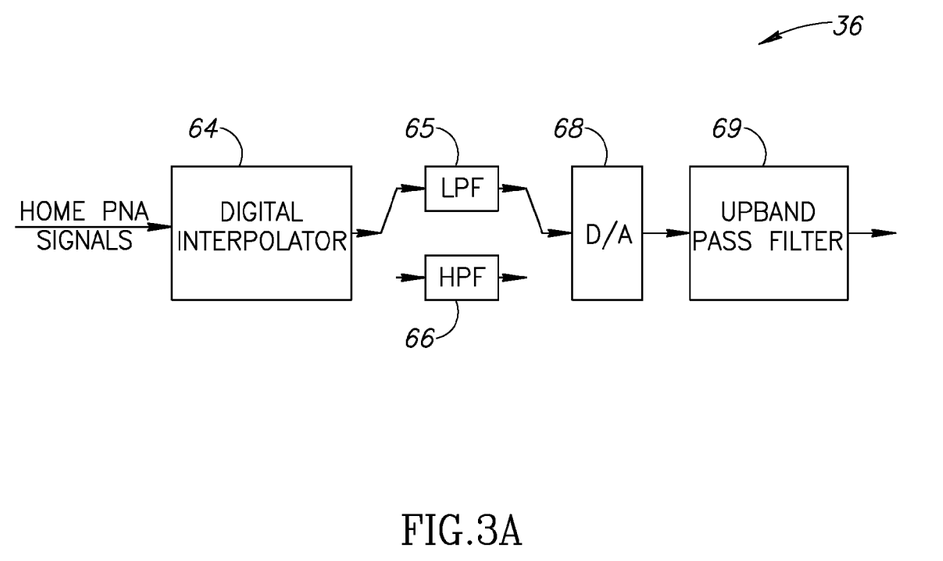
FIG. 3A is a block diagram illustration of an oversampler, useful in some of the embodiments of FIGS. 2A and 2B.

As is known in the art, when converting from digital to analog signals at a D/A conversion rate of $f_s$, spectral replicas 4 of a basic spectrum 2, located in the range of $$\left[-\frac{f_s}{2}, \frac{f_s}{2}\right],$$

are generated. Replicas 4 appear periodically in intervals $f_s$. This phenomenon may be exploited to change frequency bands. Upband pass filter 69 may pass spectral replica 4 instead of basic spectrum 2, where spectral replica 4 may be in the desired upband frequency range. This technique may enable upbanding without an analog mixer.

Figure 3B:
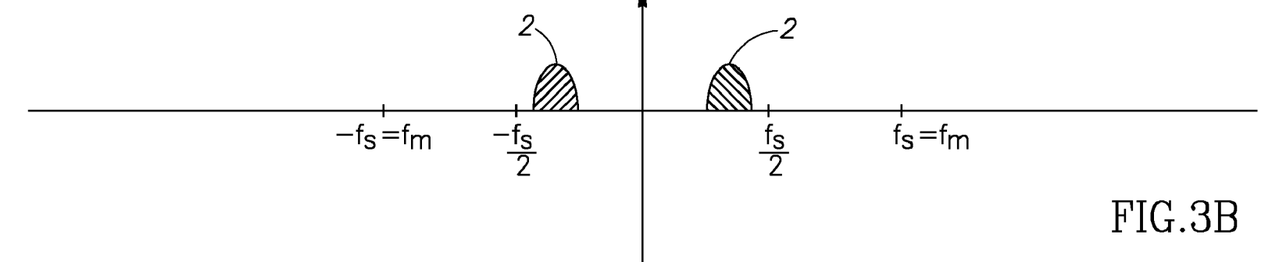
FIGS. 3B, 3C and 3D are graphical illustrations which show the operation of the oversampler of FIG. 3A.
Figure 3C:
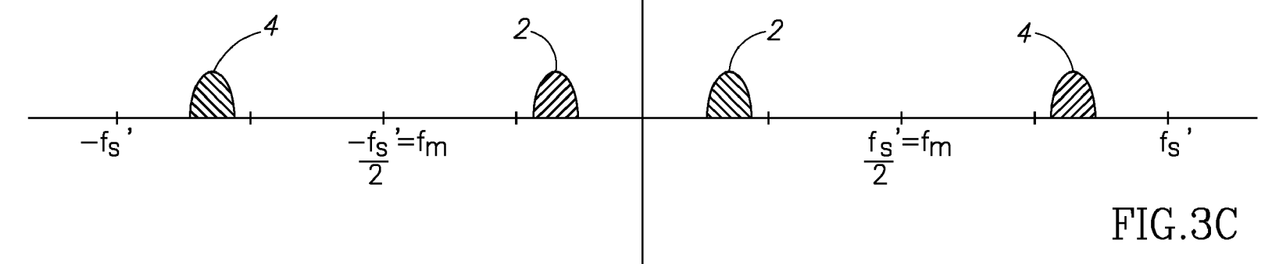
Figure 3D:
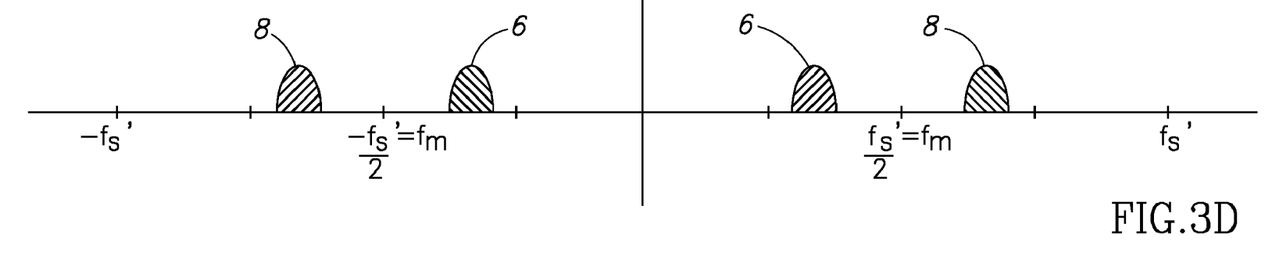

To change the location of basic spectrum 2 and/or the location of the spectral replica to be selected to be passed, sampling rate $f_s$ may be changed. This may ease the requirements on analog upband pass filter 69. For example, digital interpolator 64 may utilize a D/A conversion rate $f'_s$ different than a D/A conversion rate $f_m$ of HomePNA modem 60, where, in the embodiments of FIGS. 3C and 3D, D/A conversion rate $f'_s$ of interpolator 64 is twice that of D/A conversion rate $f_m$ of modem 60. FIG. 3B shows basic spectrum 2 for the initial sampling rate $f_s = f_m$ and FIGS. 3C and 3D show the doubled sampling rate $f'_s = 2f_m$.

In one mode, interpolator 64 may operate with LPF 65 which may cause basic spectrum 2 to appear in the range $$\left[0, \frac{1}{2}f_m\right]$$

and the first spectral replica 4 of the D/A conversion to appear in the range $$\left[\frac{3}{2}f_m, 2f_m\right].$$

Setting interpolator 64 to operate with HPF 66 may move the basic spectrum of the D/A conversion, here labeled 6, to appear in the range $$\left[\frac{1}{2}f_m, f_m\right]$$

which may generate a first replica 8 in the range $$\left[f_m, \frac{3}{2}f_m\right].$$

Upband pass filter 69 may pass the main spectrum (2 or 6) or a replica (4 or 8) as desired. HomePNA modem 60 may then transmit the resultant higher spectral replica.

Returning to FIG. 2A, receiver 44 may comprise HomePNA modem 50, operating with its local clock 51, analog demixer 37, such as is known in the art, and a phase lock loop (PLL) 59, such as is known in the art. PLL 59 may receive pilot signal 32 from transmitter 40 or 42, or from any other network device which may generate pilot signal 32, and may generate a tracked clock signal 57 from it. Analog demixer 37 may downconvert the transmitted signals, from either transmitter 40 or 42, using tracked clock signal 57. The resultant signals may be downconverted HomePNA signals which HomePNA modem 50 may process.

It will be appreciated that local clock 51 typically is not synchronized with local clock 52 of transmitter 40. However, tracked clock signal 57 (of receiver 44) may be synchronized with carrier signal 55 of transmitter 40 or with carrier signal 55' of transmitter 42 and thus, the demodulation operation of demixer 37 may be synchronized with the modulation operation of analog mixer 35 or of oversampler 36, respectively.

Receiver 46 may comprise PLL 59 and a HomePNA modem 70 with subsampler 38. HomePNA modem 70 may not have its own clock, using, instead, tracked clock signal 57 produced by PLL 59. Thus, HomePNA modem 70 may be timed to pilot signal 32 and through it, to local clock 54. Subsampler 38 may downconvert the received signals through sampling, as described hereinbelow.

Figure 3E:
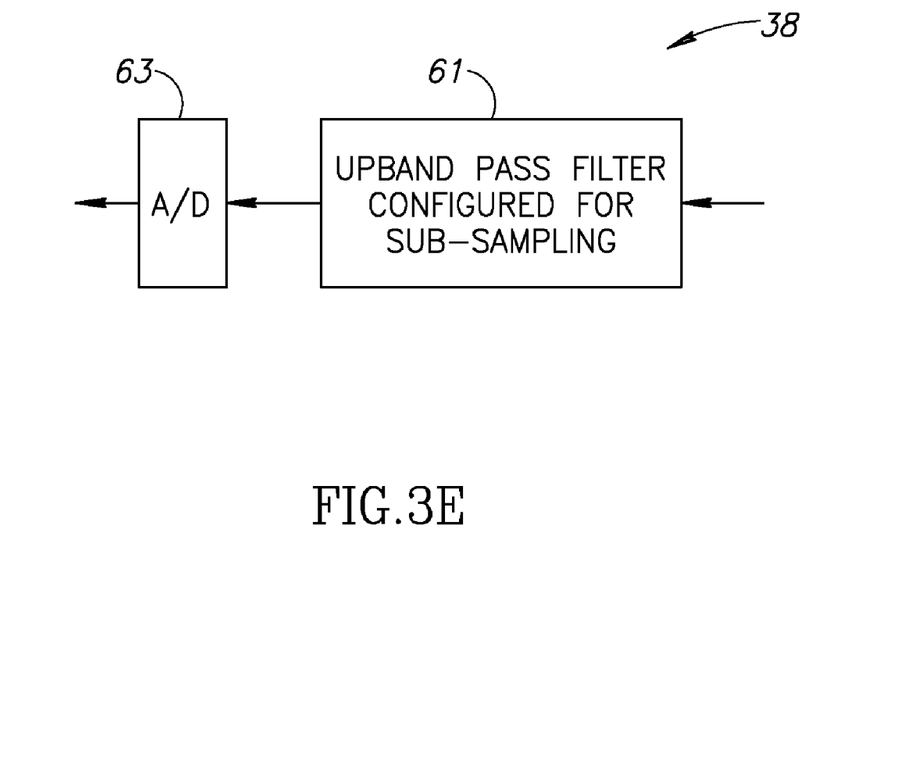
FIG. 3E is a block diagram illustration of a subsampler, useful in some of the embodiments of FIGS. 2A and 2B.
Figure 3F:
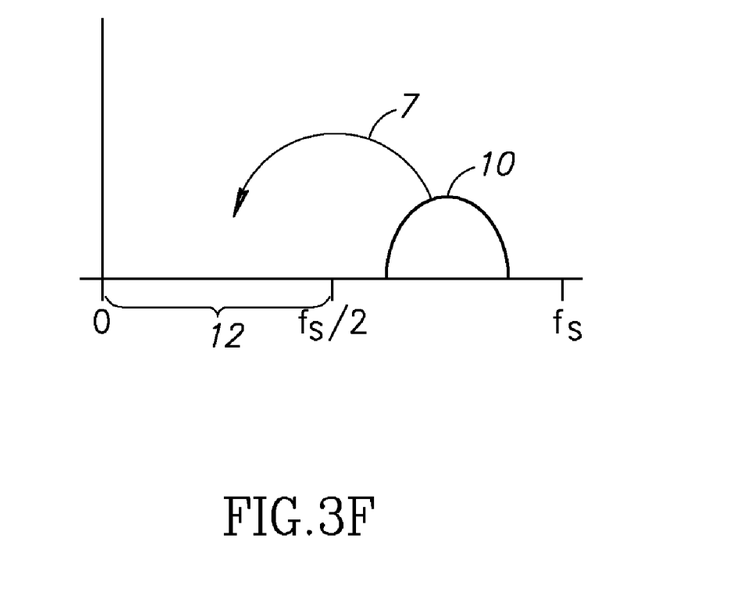
FIG. 3F is a graphical illustration of the operation of the subsampler of FIG. 3E.

FIGS. 3E and 3F, to which reference is now briefly made, illustrate the elements of subsampler 38 and its operation, respectively. Subsampler 38 may comprise an upband pass filter 61 configured for undersampling, and an analog-to-digital converter (A/D) 63 to sample the input, at a rate defined by the local clock 54, received through pilot signal 32.

Upband pass filter 61 may "clean" the transmitted signals, leaving only those in the active upband frequency range, labeled 10, such as 36-52 MHz. As is known in the art, sampling a signal at less than twice its highest frequency (otherwise known as "subsampling") causes "aliasing" of the data at higher frequencies into the basic frequency range. The signals generated by upband pass filter 61 may have a frequency range of, for example, 36-52 MHz. However, analog-to-digital converter 63 may only sample at the clock frequency, say of 64 MHz. Since the half sampling frequency $f_s/2$ (of, say 32 MHz) of analog-to-digital converter 63 may be below the frequency range (of, say, 36-52 MHz), there will be aliasing, indicated by arrow 7, of upper band 10 into the frequency band, labeled 12, of analog-to-digital converter 63. Since upper band 10 contains generally only signals in the active upband frequency range and frequency band 12 may be the basic frequency band (of less than 32 MHz), analog-to-digital converter 63 may effectively cause downconversion of upper band 10 to baseband 12.

FIG. 2B illustrates two transmitters 80 and 82 and two receivers 84 and 86, which operate without pilot signal 32. Like the embodiments of FIG. 2A, the embodiments of FIG. 2B are inter-operable. Moreover, the transmitters and receivers of FIG. 2B comprise similar elements to those of FIG. 2A, which elements carry similar reference numerals.

Transmitter 80 may comprise standard HomePNA modem 50 (with local clock 52) and analog mixer 35. In this embodiment, analog mixer 35 may generate the upconverted signals according to local clock 52, rather than according to local clock 54, as in the previous embodiment.

Transmitter 82 may comprise HomePNA modem 60 with oversampler 36. In this embodiment, HomePNA modem 60 may operate with its own clock, here labeled 62, and oversampler 36 may sample according to the timing of clock 62.

It will be appreciated that the upconverted signals from transmitters 80 and 82 may not be synchronized with any other clock in the network. However, receivers 84 and 86 may comprise clock compensator 34, discussed in more detail hereinbelow, which may compensate for the non-synchronized signals which they receive.

Receiver 84 may comprise analog demixer 37 and HomePNA modem 88 comprising clock compensator 34 and operating with its own local clock 51. Analog demixer 37 may downconvert the transmitted signals from transmitter 80 or 82, using the local clock 51 to define its demixing signal, resulting in baseband signals with residual carrier signals therein due to the expected differences in clock frequency between local clocks 52 and 51. Clock compensator 34 may generally correct for the difference in clock frequency between the transmitter (e.g. transmitters 80 and 82) and the receiver (which, in this embodiment, is receiver 84). HomePNA modem 88 may receive the baseband signals generated by analog demixer 37 and may process them with standard HomePNA processing as well as with clock compensator 34 to generate the transmitted data.

Receiver 86 may comprise a HomePNA modem 90 comprising subsampler 38 and clock compensator 34 and operating with its own local clock 51. As discussed hereinabove, subsampler 38 may downconvert the transmitted signals (from either of transmitter 80 or 82) via subsampling. However, in this embodiment, the clock for such downconversion is local clock 51. HomePNA modem 90 may then process the downconverted baseband signals, which may have residual carrier therein. Part of the processing may include compensation, with clock compensator 34, to remove the residual carrier.

Figure 4:
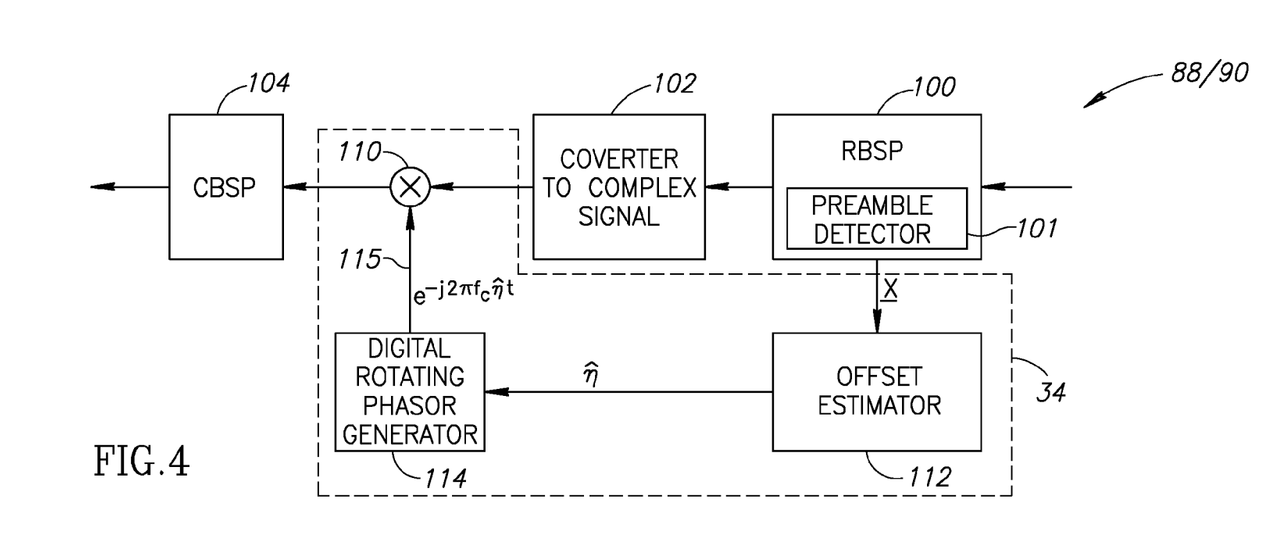
FIG. 4 is a block diagram illustration of a receiver forming part of some of the embodiments of FIGS. 2A and 2B.

Reference is now made to FIG. 4, which illustrates the elements of clock compensator 34 and the parts of HomePNA modems 88 or 90 with which compensator 34 may interact. For reception, all HomePNA modems may process both real and complex signals and may comprise a Real baseband signal processor (RBSP) 100 for real signals, a converter 102 to convert the Real signals to Complex signals and a Complex baseband signal processor (CBSP) 104 for Complex signals.

For HomePNA modems 88 and 90, clock compensator 34 may comprise a demixer 110, between converter 102 and CBSP 104, which may remove the residual carrier from the output of converter 102, providing CBSP 104 with a generally fully demodulated signal. Clock compensator 34 may additionally comprise an offset estimator 112 and a digital rotating phasor 114. Offset estimator 112 may generate an estimated offset $\hat{\eta}$ defining the relationship between a modulating frequency $f_t$ of the transmitter (80 or 82) and a demodulating frequency $f_r$ of the receiver (84 or 86), where the offset $\eta$ may be defined as the difference between frequencies $f_t$ and $f_r$ as a percentage of modulating frequency $f_t$, as follows:

$$\eta = \frac{f_t - f_r}{f_t} \qquad \text{Equation 1}$$

Digital rotating phasor generator 114 may generate a phasor 115 using estimated offset $\hat{\eta}$ and demixer 110 may utilize phasor 115 to remove the residual carrier from the output of converter 102. Phasor 115 might be $e^{-j2\pi f_c \hat{\eta} t}$, where $f_c$ may be the nominal carrier frequency (for example, 64 MHz).

Figure 5:
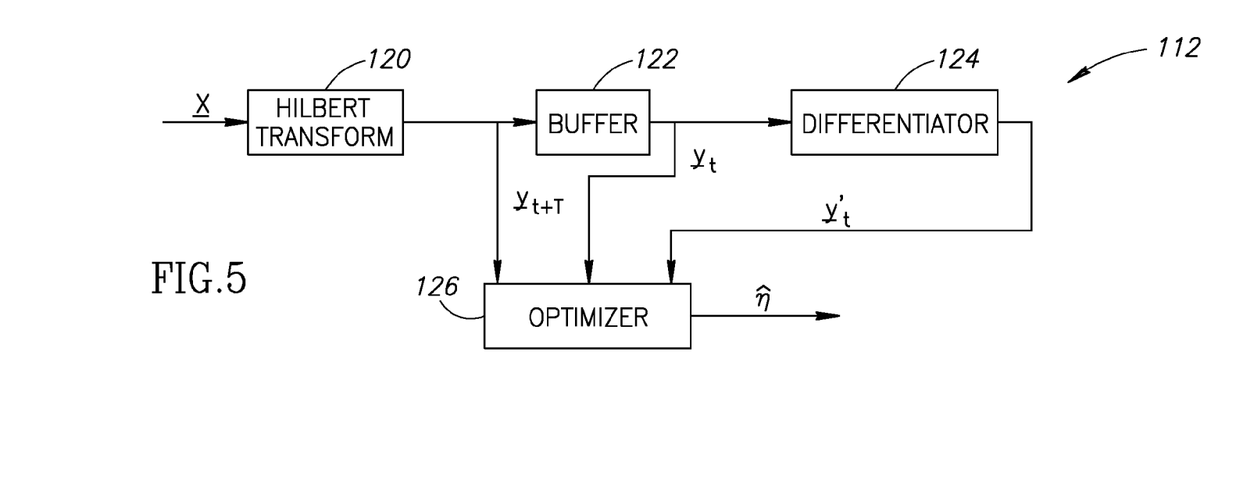
FIG. 5 is a block diagram illustration of an offset estimator forming part of the receiver of FIG. 4.

Reference is now made to FIG. 5 which illustrates the elements of the offset estimator. Offset estimator 112 may comprise a Hilbert transform operator 120, a buffer 122, a differentiator 124 and an optimizer 126. Hilbert transform operator 120 may receive an input sequence x from first baseband processor 100, where input sequence $\overline{x}$ may be demodulated samples of the preamble of a newly received packet, as determined by a preamble detector 101, such as are known in the art, forming part of RBSP 100, and may generate a Hilbert transform y of x. A Hilbert transform may filter out the negative spectrum while leaving the information in the signal intact.

Optimizer 126 may receive the output of Hilbert transform operator 120, denoted by the vector $\underline{y}_{t+T}$, a version $\underline{y}_t$ delayed by one preamble period T and generated by buffer 122 from vector $\underline{y}_{t+T}$, and a time derivative $\underline{y}'_t$ of vector $\underline{y}_t$, generated by differentiator 124.

Optimizer 126 may create a cost function CF(η) from the three versions of Hilbert transform $\underline{y}$ and may attempt to optimize cost function CF(η) to find the estimated carrier offset $\hat{\eta}$. Cost function CF(η) may be a square norm of a linear combination of the three vectors $\underline{y}_{t+T}$, $\underline{y}_t$ and $\underline{y}'_t$, where the linear combination coefficients are functions of the offset η, the preamble period T and the nominal carrier frequency $f_c$, as follows:

$$CF(\eta) = |\underline{y}_{t+T} - (1 - j2\pi f_c T\eta^2)e^{j2\pi f_c T\eta}\underline{y}_t - \eta T e^{j2\pi f_c T\eta}\underline{y}'_t|^2 \quad \text{Equation 2}$$

Optimizer 126 may perform a binary search based on the sign of a derivative of cost function CF(η). Optimizer 126 may provide estimated carrier offset $\hat{\eta}$ to phasor generator 114 to generate phasor 115 in time to demodulate the signal coming from converter 102.

Figure 6:
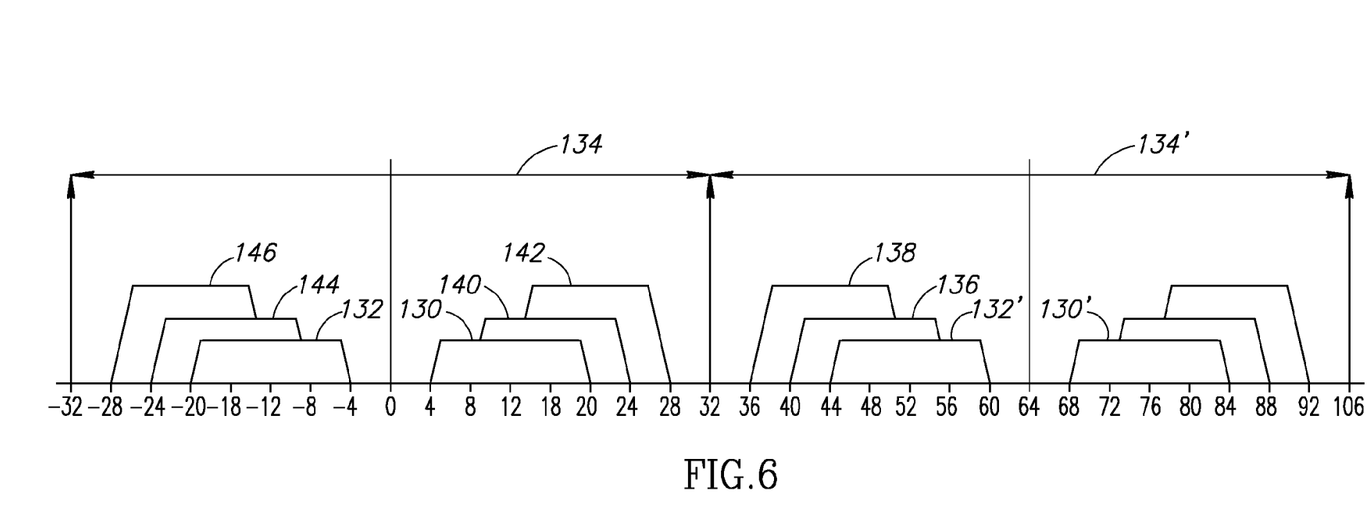
FIG. 6 is a graphical illustration of multiple, selectable upbands for HomePNA transmission.
Figure 7:
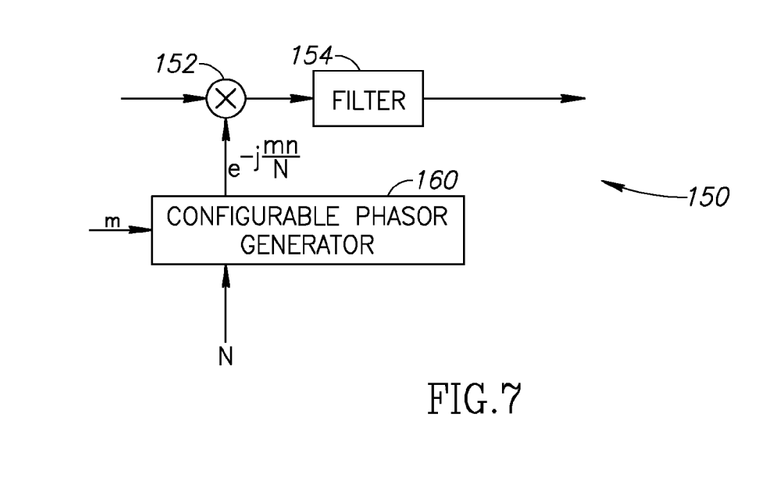
FIG. 7 is a block diagram illustration of elements of a converter between complex and real signals which are changed to provide the multiple, selectable upbands of FIG. 6.

Reference is now made to FIGS. 6 and 7, which illustrate an alternative embodiment of the present invention which may provide multiple, selectable upbands for HomePNA transmission. FIG. 6 is a frequency graph and FIG. 7 shows the elements of any of the HomePNA modems described hereinabove that are changed to generate the upbands of FIG. 6.

Each HomePNA modem may generate signals within a basic frequency band 130 of 4-20 MHz. As is known in the art, because the transmitted signals are Real, the transmission of frequency band 130 may also generate signals in the negative frequencies, in a mirrored band 132 from −4 to −20 MHz. As described hereinabove, the HomePNA signals may be modulated, in various ways, with a carrier frequency C, such as 64 MHz, to translate baseband frequency band 130 into a desired frequency. As is known in the art, the digital to analog conversion may generate replicas of a frequency band 134 of width C (i.e. 64 MHz), centered about 0 MHz. FIG. 6 shows one copy, labeled 134', from 32 to 96 MHz, which may comprise translated frequency bands 130' and 132' of original frequency band 130 and mirrored frequency band 132.

As can be seen in FIG. 6, translated frequency band 132' may extend from 44-60 MHz. Applicants have realized that frequency band 132' may not have the most desirable range, given the presence of cable television starting at 54 MHz. One solution may be to utilize a different carrier frequency, but that solution requires additional, expensive radio frequency (RF) hardware to generate the carrier frequency.

In accordance with a preferred embodiment of the present invention, the translation may be made to more desirable ranges without adding RF hardware. For example, original frequency band 130 may be translated to a frequency band 138 of 36-52 MHz. Alternatively, it may be translated to a frequency band 136 of 40-56 MHz. This may be achieved by shifting original frequency band 130 slightly higher before modulation, to generate a mirrored frequency band closer to −32 MHz. The resultant translated frequency band may be closer to +32 MHz.

FIG. 6 shows three exemplary baseband frequency bands, original frequency band 130, and two shifted baseband frequency bands 140 and 142. Frequency band 140 may extend from 8-24 MHz while frequency band 142 may extend from 12-28 MHz. FIG. 6 also shows mirrored band 132 and two mirrored bands 144 and 146 of frequency bands 140 and 142, respectively, as well as their upconverted bands 132', 136 and 138, respectively. Translated mirrored band 138 may have a range of 36-52 MHz, which range fits below cable television range 24 (FIG. 1) (which starts at 54 MHz). An upband pass filter before transmission may select translated mirrored band 138 and may attenuate any remaining translated bands.

FIG. 7 illustrates elements 150 of a converter between complex and real signals, such as converter 102, that are involved in shifting the baseband frequency range. The converter may comprise a digital mixer 152, a filter 154, and a configurable phasor generator 160. Phasor generator 160 may receive configuration values m & N, together indicating the desired one of the selectable frequency ranges, and may generate a phasor therefrom. For example, the phasor might be $e^{-jmn/N}$, where n may be the index of the current data sample. The data may be the received signals (in the receiver) or the data to be transmitted (in the transmitter). The ratio of configuration values m and N may be positive for one direction (transmission or reception) and negative for the other (reception or transmission). Mixer 152 may then mix the phasor with the data to be shifted and filter 154 may filter the data to the desired frequency band, thereby shifting the data slightly up (for transmission) or slightly down (for reception).

It will be appreciated that the translation may be made to any desired set of ranges. The ranges may be the translated ranges 140 and 142, or the translated mirrored ranges 136 and 138 or to other ranges, depending on the circumstances and as desired. For example, it may be desired to transmit in translated range 142, from 12-28 MHz or in any other range, as desired.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network device comprising:
a modem to generate HomePNA signals;
transmission means for transmitting said HomePNA signals at shifted baseband frequencies; and
reception means to downconvert signals transmitted from a transmission means of another network device, wherein said reception means comprises an analog demixer.

2. The network device according to claim 1 and wherein said transmission means comprises an analog mixer.

3. The network device according to claim 2 and also comprising a pilot tracking unit providing a carrier signal to said analog mixer.

4. The network device according to claim 2 and also comprising a local clock providing a carrier signal to said analog mixer.

5. The network device according to claim 1 and wherein said transmission means comprises an oversampler.

6. The network device according to claim 5 and wherein said oversampler comprises a digital interpolator to increase a sampling frequency of said HomePNA signals, a digital-to-analog converter to convert an output of said digital interpolator to an analog signal and an upband pass filter to significantly attenuate signals not within said non-baseband frequencies.

7. The network device according to claim 5 and also comprising a pilot tracking unit providing a clock signal to said oversampler.

8. The network device according to claim 5 and also comprising a local clock providing a clock signal to said oversampler.

9. The network device according to claim 1 and also comprising a pilot tracking unit providing a carrier signal to said analog demixer.

10. The network device according to claim 1 and also comprising a local clock providing a carrier signal to said analog demixer and a digital clock compensator using said local clock to compensate for a difference in clock frequency of said local clock and of a local clock which generated said transmitted signals.

11. The network device according to claim 1 and wherein said reception means comprises a subsampler.

12. The network device according to claim 11 and wherein said subsampler comprises an upband pass filter to significantly attenuate signals not within said upband frequencies and an analog-to-digital converter forming part of said reception means and sampling at an operating clock frequency of said reception means.

13. The network device according to claim 11 and also comprising a pilot tracking unit providing a clock signal to said subsampler.

14. The network device according to claim 11 and also comprising a local clock providing a clock signal to said subsampler and a digital clock compensator using said local clock to compensate for a difference in clock frequency of said local clock and of a local clock which generated said transmitted signals.

15. The network device according to claim 10 and wherein said digital clock compensator comprises:
a phasor generator to generate a phasor from an estimated carrier offset $\hat{\eta}$; and
a mixer to mix a baseband signal with said phasor.

16. The network device according to claim 15 and also comprising an offset estimator to determine said estimated carrier offset $\hat{\eta}$.

17. The network device according to claim 16 and wherein said offset estimator comprises a Hilbert transform operator to transform at least received baseband signals.

18. The network device according to claim 16 and wherein said offset estimator comprises an optimizer to optimize a cost function $CF(\eta)$ of a Hilbert transform $\underline{y}$ and of at least one function of Hilbert transform y.

19. The network device according to claim 18 and wherein said cost function $CF(\eta)$ is:

$$CF(\eta) = |\underline{y}_{t+T} - (1 - j2\pi f_c T\eta^2)e^{j2\pi f_c T\eta}\underline{y}_t - \eta T e^{j2\pi f_c T\eta}\underline{y}'_t|^2$$

where vector $\underline{y}_{t+T}$ is the output of said Hilbert transform operator, vector $\underline{y}_t$ is a version of $\underline{y}_{t+T}$ delayed by a preamble period T, vector $\underline{y}'_t$ is a derivative of $\underline{y}_t$ and the linear combination coefficients of said vectors are functions of offset η, said preamble period T and a nominal carrier frequency $f_c$.

20. The network device according to claim 1 and wherein said non-baseband frequencies are in a frequency range and wherein said frequency range is one of the following ranges: 8-24 MHz, 12-28 MHz, 36-52 MHz, 40-56 MHz and 44-60 MHz.

21. The network device according to claim 1 and wherein said non-baseband frequencies are in a frequency range and wherein said frequency range is selectable.

22. A network device comprising:
a HomePNA modem; and
means for synchronizing a clock of said HomePNA modem with clocks of other HomePNA modems in a network, in order to communicate with HomePNA signals at a shifted baseband_frequency, wherein said means for synchronizing comprises a digital clock compensator.

23. The network device according to claim 22 and wherein said means for synchronizing comprises a phase locked loop.

24. The network device according to claim 22 and wherein said digital clock compensator comprises:
a phasor generator to generate a phasor from an estimated carrier offset $\hat{\eta}$; and
a mixer to mix a baseband signal with said phasor.

25. The network device according to claim 24 and also comprising an offset estimator to determine said estimated carrier offset $\hat{\eta}$.

26. The network device according to claim 25 and wherein said offset estimator comprises a Hilbert transform operator to transform at least received baseband signals.

27. The network device according to claim 25 and wherein said offset estimator comprises an optimizer to optimize a cost function $CF(\eta)$ of a Hilbert transform $\underline{y}$ and of at least one function of Hilbert transform y.

28. The network device according to claim 27 and wherein said cost function $CF(\eta)$ is:

$$CF(\eta) = |\underline{y}_{t+T} - (1 - j2\pi f_c T\eta^2)e^{j2\pi f_c T\eta}\underline{y}_t - \eta T e^{j2\pi f_c T\eta}\underline{y}'_t|^2$$

where vector $\underline{y}_{t+T}$ is the output of said Hilbert transform operator, vector $\underline{y}_t$ is a version of $\underline{y}_{t+T}$ delayed by a preamble period T, vector $\underline{y}'_t$ is a derivative of $\underline{y}_t$ and the linear combination coefficients of said vectors are functions of offset η, said preamble period T and a nominal carrier frequency $f_c$.

29. The network device according to claim 22 and wherein said shifted basband_frequencies are in a frequency range and wherein said frequency range is one of the following ranges: 8-24 MHz, 12-28 MHz, 36-52 MHz, 40-56 MHz and 44-60 MHz.

30. The network device according to claim 22 and wherein said shifted basband frequencies are in a frequency range and wherein said frequency range is selectable.

* * * * *